United States Patent [19]

Freund

[11] 4,034,226
[45] July 5, 1977

[54] METHOD OF AND MEANS FOR PRODUCING RADIATION IN THE X-RAY REGION

[75] Inventor: Isaac Freund, Petah Tiqva, Israel

[73] Assignee: Bar-Ilan University, Ramat-Gan, Israel

[22] Filed: May 29, 1974

[21] Appl. No.: 474,329

[30] Foreign Application Priority Data

May 30, 1973 Israel .................................. 42398

[52] U.S. Cl. .......................... 250/493; 331/94.5 P; 331/94.5 G; 330/4.3
[51] Int. Cl.² .......................................... H01S 4/00
[58] Field of Search ................... 331/94.5; 330/4.3; 250/293

[56] References Cited

OTHER PUBLICATIONS

Slutz et al., Univ. of Calif. Res. Lab – 74959 Report (Conf-731009 – 12, Oct. 26, 1973.
Freund, Applied Physics Letters, vol. 24, No. 1, Jan. 1, 1974, pp. 13 thru 15.
Braunlich et al., Physical Review A, vol. 5, No. 3, Mar. 1972, pp. 1013–1025.

Primary Examiner—Robert J. Webster
Attorney, Agent, or Firm—Donald M. Sandler

[57] ABSTRACT

A method for producing stimulated emission of radiation in the X-ray region comprising the steps of: selecting as an active medium a system having the following properties; two energy levels separated by an energy difference $\Delta E$ corresponding to radiation of frequency $\omega_t$ in the X-ray region such that a transition from the upper to the lower of the two levels by one-photon emission is weakly allowed or strictly forbidden, one of the two levels having a nearly degenerate partner level optically coupled thereto such that a transistion therebetween by one-photon emission has a high probability; providing a resonator containing such an active medium; subjecting the active medium in the resonator to stimulating radiation at a frequency $\omega_1$ that is preferably, substantially equal to the frequency of the optical coupling between the nearly degenerate levels but much smaller than the frequency $\omega_t$; arranging for the polarization of the stimulating radiation to be parallel to the polarization of the output of the resonator; and turning the resonator to the frequency $\omega_2 = \omega_t \pm \omega_1$.

10 Claims, 5 Drawing Figures

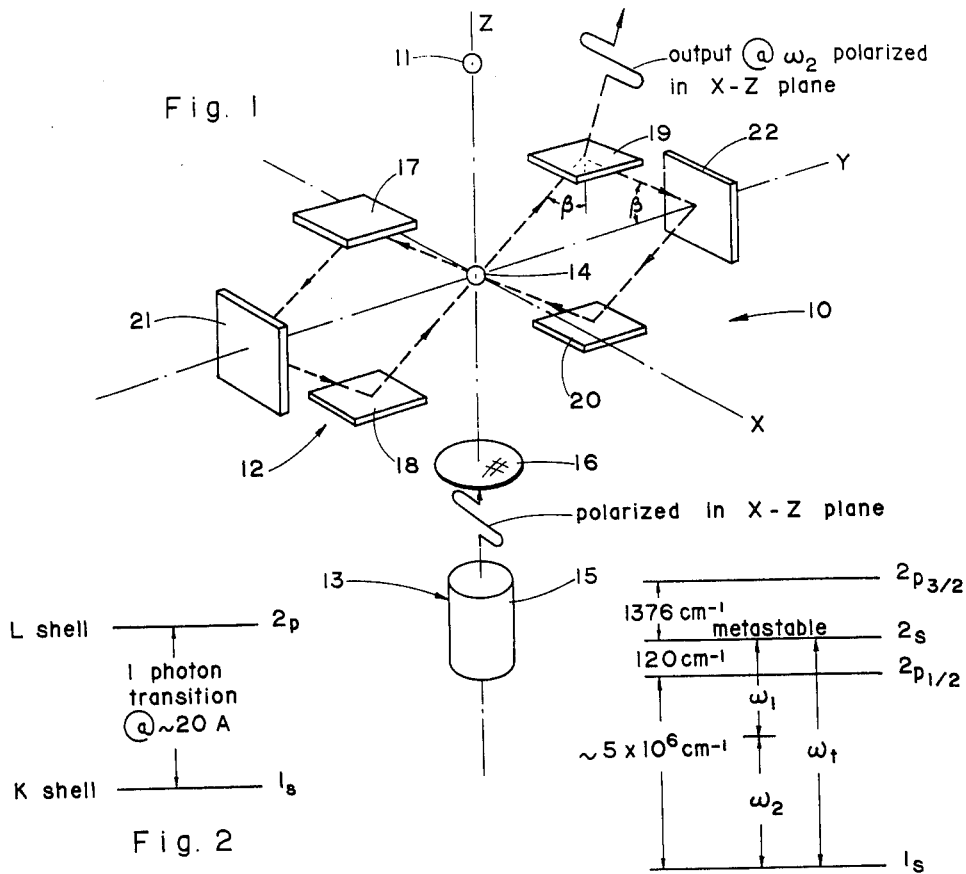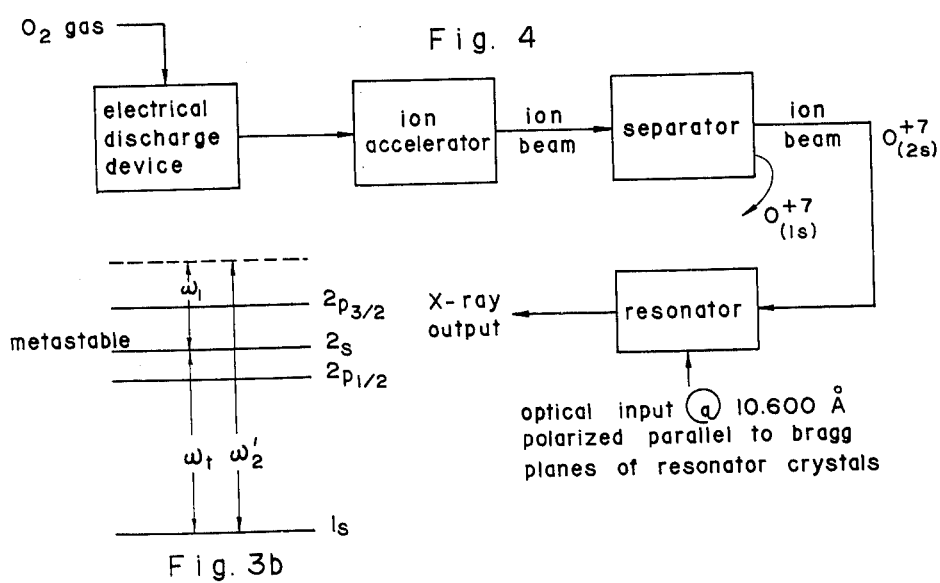

METHOD OF AND MEANS FOR PRODUCING RADIATION IN THE X-RAY REGION

This invention relates to a method of and means for producing stimulated radiation in the X-ray region.

An article by T. C. Bristow, M. J. Lubin, J. M. Forsyth, E. B. Goldman and J. M. Soures appearing in *Optics Communications*, Vol. 5, page 315 (1972) reports on a plasma experiment that produces X-rays. In such experiment, a pellet of lithium deuteride doped with a small percentage of oxygen is dropped into the focus of the output beam produced by a neodymium-glass laser. The energy of such a beam is about 100 joules and is produced in a pulse lasting about $10^{-10}$ seconds. By suitable optics, the area of the focus is about 0.01 mm$^2$ producing an intensity at the focus of about $10^{16}$ watts/cm$^2$. Such a large intensity pulse vaporises the pellet producing a plasma, and strips electrons from oxygen nuclei forming $O^{+7}$ ions. The $2p$ state of this ion is separated from the $1s$ state by about 600 electron volts so that upon relaxation of these ions there is resultant radiation at a wavelength of about 19 Angstroms, which is within the X-ray region, as well as considerable radiation at other wavelengths.

The experiment referred to above indicates the possibility of constructing an X-ray laser based on the 1 photon $2p \rightarrow 1s$ transition of the $O^{+7}$ ions. In order to enhance the output due to this transition, a resonator to contain the plasma is required. By reason of the wavelength involved, a suitable resonator would be one similar to the resonator described by R. M. J. Cotterill in an article appearing in *Applied Physics Letters*, Vol. 12, page 403 (1968). Such a resonator is based on the use of planar Germanium crystals arranged in a configuration that causes radiation from the active medium to pass back into inself due to reflections from the crystals in accordance with Bragg's Law. In constructing such a resonator for use in an X-ray laser, one would position the crystals at angles with respect to each other and with respect to the active medium that conform to the wavelength of the radiation that is desired. In this case, the desired wavelength is that resulting from the $2p \rightarrow 1s$ transition of $O^{+7}$.

Whether there is a net output from the apparatus constructed in accordance with the above principles, will depend upon whether the small signal gain exceeds the small signal single-pass loss due to the absorption of energy and the resultant excitation of ground state ions. The gain is proportional to the number of atoms that are excited and this, in turn, depends on the optical laser input intensity. The gain is also proportional to the probability of stimulated emission, i.e., emission in the presence of a stimulating beam; and this probability is a property of the atom involved, as well as the transition being utilized.

It is therefore an object of the present invention to provide a method of and means for producing stimulated radiation at a desired wavelength, and particularly at a wavelength in the X-ray region, at which threshold is exceeded thereby producing a true X-ray laser.

According to the present invention, there is provided a method for producing stimulated emission of radiation in the X-ray region comprising the steps of: selecting as an active medium a system having the following properties: two energy levels separated by an energy difference $\Delta E$ corresponding to radiation of frequency $\omega_t$ in the X-ray region such that a transition from the upper to the lower of the two levels by one-photon emission is weakly allowed or strictly forbidden, one of the two levels having a nearly degenerate partner level optically coupled thereto such that a transition therebetween by one-photon emission has a high probability: providing a resonator containing such an active medium; subjecting the active medium in the resonator to stimulating radiation at a frequency $\omega_1$ that is preferably, substantially equal to the frequency of the optical coupling between the nearly degenerate levels but much smaller than the frequency $\omega_t$; arranging for the polarization of the stimulating radiation to be parallel to the polarity of the output of the resonator; and tuning the resonator to the frequency $\omega_2 = \omega_t \pm \omega_1$.

There are many systems having levels satisfying the above requirements, and such systems are referred to hereinafter as "systems of the type described". The term "optical coupling between levels" in systems of the type described means that the energy difference between the levels corresponds to radiation whose wavelength lies in the far and near infrared region as well as the visible region of the spectrum, and wherein there is a high probability of a one-photon transition between levels. Optically coupled levels are said to be "nearly degenerate"; consequently, if one level is identified, another level optically coupled thereto is said to be a "nearly degenerate partner level".

Under the influence of an intense optical field, systems of the type described undergo a two-photon transition from an upper to a lower state. one photon occurs at the stimulating optical frequence $\omega_1$ and the other photon at the frequency $\omega_2$. Photons at the frequency $\omega_2$ represent the output of the resonator which will be in the X-ray region and only slightly different in frequency from the frequency $\omega_t$ since $\omega_1 << \omega_t$.

A class of systems of the type described is one containing hydrogenic ions which have an upper level that is metastable (i.e., $2s$) and thus meets the criterion that a one-photon transition to the ground state is only weakly allowed. Furthermore, the $2s$ metastable state of a hydrogenic ion has two nearly degenerate partners, namely the $2p_{3/2}$ and the $2p_{1/2}$ states. It can be shown that if the optical laser intensity is sufficiently high (e.g., $10^{16}$ watts/cm$^2$) and in the absence of extreme level broadening, that the small signal gain for the two-photon $2s \rightarrow 1s$ transition exceeds that for the one-photon $2p \rightarrow 1s$ transition. As a consequence of the relatively long radiation lifetimes of the metastable states (in the order of magnitude of $10^{-7}$ sec.) as compared to the relatively short radiative lifetimes of the non-metastable excited states (in the order of magnitude of $10^{-10}$ sec.), it is possible to achieve a large two-photon gain at modest pumping levels and optical laser intensities.

Of primary interest are ions in which the $2s$ state is separate from the $1s$ state by an energy difference corresponding to a wavelength of less than above 100 Angstroms which is a generally accepted upper boundary for the X-ray region. Ions of this character are $N^{+6}$, $O^{+7}$ and $F^{+8}$ as well as those of higher atomic number. The preferred ion is $O^{+7}$ which is contained in the plasma resulting from the vaporization of a pellet of oxygen-doped lithium deuteride at the focus of the output of a neodymium-glass laser. The $2s$ state of $O^{+7}$ is separated from the $1s$ state by about $5 \times 10^6$ cm$^{-1}$ (about 19 Angstroms, and well within the X-ray region) while the output of the neodymium laser is at 10,600 Angstroms (9430 cm$^{-1}$). The $2p_{3/2}$ and $2p_{1/2}$ levels of the ion are separated from the 2s level by +1376 cm$^{-1}$ and −120 cm$^{-1}$ respectively. The coupling between the ap levels and the 2s level is thus in the infra-red region so that all of the criteria specified above are met with the 0$^{+7}$ ion.

The invention also consists in apparatus for producing stimulated emission of radiation in the X-ray region utilizing a system of the type described and comprising a resonator adapted to contain the active medium and tuned to a frequency $\omega_2 = \omega_t \pm \omega_1$ where $\omega_t$ corresponds to the energy difference $\Delta E$, and a laser for directing stimulating radiation at a frequency $\omega_1$ into the resonator, the energy of the stimulating radiation being greater than, equal to, or less than the energy difference between the two optically-coupled levels of the active medium but mush smaller than $\Delta E$, and the polarization of the stimulating radiation being parallel to the polarization of the output of the resonator.

In the preferred embodiment of the apparatus, the resonator is of the Cotterill-type such as is described in the reference: R. M. J. Cotterill, *Applied Physics Letters*, Vol. 12, page 403, (1968).

Embodiments of the invention are illustrated by way of example in the accompanying drawings, wherein:

FIG. 1 is the first embodiment of apparatus for producing pulsed stimulated emission of radiation in the X-ray region, and is in schematic perspective form;

FIG. 2 is an energy level diagram for a system of the type described;

FIGS. 3a and 3b are energy level diagrams for 0$^{+7}$ illustrating the various energies associated with two types of a two-photon transition from the L shell to the K shell; and FIG. 4 is a block diagram illustrating a second embodiment of the apparatus by which stimulated emission of rediation in the X-ray region is achieved on a continuous or a pulsed basis.

Referring now to FIG. 1, reference numeral 10 designates apparatus for producing stimulated radiation in the X-ray region according to the present invention. Apparatus 10 comprises a source of pellets of oxygen-doped lithium deuteride 11, resonator system 12 and optical laser system 13. By means of a synchronizing system (not shown) source 11 is caused to drop a pellet such that it reaches focus 14 of the laser system at the instant the latter is fired. This arrangement is shown and described in the Bristow et al article cited above where the laser system comprises a neodymium-glass laser 15 producing a polarized polse of light at 10,600 Angstroms lasting about 10$^{-10}$ seconds with an energy content of about 100 joules. Lens 16 of the laser system focuses this beam to a spot about 0.01 mm$^2$ located at focus 14.

The focus 14 forms the origin of a coordinate system having mutually orthogonal axes X, Y and Z as shown in FIG. 1, and is located at the center of resonator system 12 which is based on the Cotterill reference cited above. System 12 thus comprises a plurality of planar crystals of Germanium arranged as indicated in FIG. 1. Crystals 17 and 18, on the one hand, and 19 and 20 on the other hand, constitute two pairs of crystals lying parallel to the X-Y of the coordinate system and perpendicular to the Z- axis, while crystals 21 and 22 constitute a pair of crystals lying parallel to the Z-X plane and perpendicular to the Y axis.

The orientation of the crystals with respect to the focus 14 is such as to satisfy Bragg's Law for radiation at the output frequency $\omega_2$ of the resonator 12. Specifically, the angle $\beta$ between the normal to each crystal and the direction of radiation incident thereon is functionally related to the wavelength $\lambda_2$ and to the atomic spacing associated with the crystals. In addition to tuning the resonator to the frequency $\omega_2$, the laser 15 must be arranged so that the polarization of its output (shown as lying in the X-Z plane for reference purposes) is in a plane parallel to the polarization of the output of the resonator.

In a resonator of the type shown in FIG. 1, the gain is the most important parameter. The gain is proportional to the number of atoms that are excited, which is a quantity dependent on the intensity of the optical laser, as well as to the probability of stimulated emission (i.e. emission in the presence of a stimulating beam). Thus, the gain is related in part to properties associated with the resonator and the optical laser, which properties are independent of the active medium present in the resonator, and in part to the atoms in the active medium and to the transitions being utilized. The active medium, which in effect constitutes an amplifier, should thus be selected to provide as large a gain as possible.

In general, the single pass gain g associated with an active medium in a laser system is related to the intensity $I_Q$ leaving the active medium and the intensity $I_o$ entering the active medium by the following equation:

$$I_Q/I_o = \exp(gQl) \tag{1}$$

where the quantity $Q$ is termed the "quality" of the resonator and is related to the average number of times that radiation passes through the focus 14 before escaping from the resonator, and $l$ is the single-path length of the radiation in the medium. To have a net output, the active medium must be selected and the resonator must be constructed so that the net gain (Qg) exceeds the loss; and in such case it is said that the threshold has been exceeded.

Given the present state of the art as exemplified by the Bristow et al apparatus into which a Cotterill type resonator has been incorporated, it is not likely that threshold can be exceeded. The state of the art device has the formidable input intensity of 10$^{16}$ watts per cm$^2$, and while it is conceivable that this quantity can be increased to some extent in order to increase the single-pass gain without a concommitant increase in the loss due to absorption, this approach to exceeding the threshold is limited by practical consideration. The present invention departs from the prior art, not in selection of another atom, since oxygen may also be utilized in the present invention, but in the selection of the other variable upon which the gain is dependent, namely the transition involved in the process. The prior art employs the one photon $2p \rightarrow 1s$ transition of 0$^{+7}$ (see FIG. 2) while the present invention employs the two photon $2s \rightarrow 1s$ transition (see FIG. 3). The reason the latter transition achieves superior results as compared to the prior art can be explained by theoretical considerations of the quantities upon which the small signal gain is dependent.

By a modification of the theory presented formally by M. Goppert-Mayer in the publication *Ann. Phys. Lpz.* 9. 273 (1931) it is possible to compare the small signal gain for the $2s \rightarrow 1s$ two photon transition utilized in the present invention with the gain resulting from the $2p \rightarrow 1s$ transition associated with the prior art approach. It can be shown that the two-photon small signal gain g is:

$$g = K(I_1/\omega_1^2) M_{a,b}^2 (1/\Delta\omega) \quad (2)$$

where $K$ = a constant, $I_1$ = the intensity of the optical laser, $\omega_1$ is the frequency of the output of the optical laser, and the quantity $M_{a,b}$ is a matrix element dependent on the atom involved in the transition from level $a$ to level $b$, and $\Delta\omega$ is the line width of the transition. Note that the quantities $I_1$ and $\omega_1$ are independent of the atom and are dependent only on the external optical laser, while $\Delta\omega$ and the matrix element is dependent on the atom involved and its transition. If $|M_{a,b}|^2$ does not depend on $\omega_1$, then $g$ can be large inasmuch as $\omega_1$ is a small frequency (as compared to $\omega_2$).

In order for the small signal gain to be proportional to the quantity $1/(\omega_1)^2$, the matrix element $M_{a,b}$ must be independent of $\omega_1$. A sufficient condition for this constrant on $M_{a,b}$ is that either the upper or the lower level be both nearly degenerate and optically coupled to its degenerate partner. If this condition is not satisfied, then $M_{a,b}$ will be smaller by a factor which is of order $\omega_1/\omega_2$. There are a variety of systems having levels satisfying these requirements and it is of course possible that laser systems can be constructed based on the principles described herein which will produce outputs at frequencies other than in the X-ray region.

Instead of the pulsed system shown in FIG. 1, the present invention can be utilized in a different pulsed or in a steady state condition by following the apparatus 50 illustrated in FIG. 4. Apparatus 50 comprises a source (not shown) of oxygen gas, electronic discharge device 51 for converting gaseous oxygen into $0^{+7}$ ions which flow into an ion accelerator 53 producing an ion beam directed into a separator 52 where only ions in the metastable state are passed into resonator 54. Separator 52 is one producing non-uniform electric and/or magnetic fields through which the stream or a pulse of $0^{+7}$ ions flow thereby separating the ions based on the state of the ions. A continuous or a pulsed optical input at say 10,600 Angstroms and polarized parallel to the Bragg planes of the resonator crystals is applied to resonator 54 by a suitable optical laser. The resultant output will be a continuous or a pulsed beam of coherent X-rays at about 19 Angstroms for such case the resonator will, of course, be turned to the precise frequency $\omega_2 = \omega_t \pm \omega_1$.

The direction of the ion beam is chosen to be perpendicular to both the plane of reflectance of the resonator (the YZ plane of FIG. 1) and the direction of propagation of the optical laser beam (Z axis in FIG. 1) in order to eliminate line broadening of the transition due to the Doppler effect.

I claim:

1. A method for producing emission of radiation in the X-ray region at a frequency $\omega_2$ comprising the steps of: selecting as an active medium a system having the following properties; two energy levels separated by an energy difference $\Delta E$ corresponding to radiation of frequency $\omega_t$ in the X-ray region such that a transition from the upper to the lower of the two levels by one-photon emission is weakly allowed or strictly forbidden, one of the two levels having nearly degenerate partner level optically coupled thereto such that a transition therebetween by one-photon emission has a high probability; subjecting the active medium to radiation at a frequency $\omega_1$ that is substantially equal to the frequency of the optical coupling between the nearly degenerate levels but much smaller than the frequency $\omega_t$ such that $\omega_2=\omega_t\pm\omega_1$; and polarizing the radiation of frequency $\omega_1$.

2. A method according to claim 1 wherein the upper of the two levels is metastable and has a nearly degenerate partner.

3. A method according to claim 1 wherein the system contains hydrogenic ions where the upper level is the $2s$ metastable level, the lower level is the $1s$ ground level, and the nearly degenerate partner level is a $2p$ level.

4. A method according to claim 1 wherein the active medium includes hydrogenic ions selected from the group comprising oxygen, nitrogen, and fluorine.

5. A method according to claim 1 wherein the system contains $0^{+7}$ ions.

6. A method according to claim 1 wherein the output of a neodymium-glass laser is used as the stimulating radiation.

7. Apparatus for producing radiation in the X-ray region at frequency $\omega_2$ comprising: an active medium having the following properties: two energy levels separated by an energy difference $\Delta E$ corresponding to radiation of frequency $\omega_t$ in the X-ray region such that a transition from the upper to the lower of the two levels by one-photon emission is weakly allowed or strictly forbidden, one of the two levels having nearly degenerate partner level optically coupled thereto such that a transition therebetween by one-photon emission has a high probability; a laser for directing radiation at a frequency $\omega_1$ where $\omega_2=\omega_t\pm \omega_1$, the energy of the radiation at frequency $\omega_1$ being substantially equal to the energy difference between the nearly degenerate partner levels of the medium but much smaller than $\Delta E$, and the radiation at frequency $\omega_1$ being polarized.

8. Apparatus according to claim 7 wherein the active medium contains $0^{+7}$ derived from a pellet of oxygen-doped lithium deuteride positioned at the focus of the laser.

9. Apparatus according to claim 7 wherein the laser is neodymium-glass.

10. Apparatus for producing radiation in the X-ray region comprising:
an electronic discharge device adapted to receive oxygen gas and to convert it into $0^{+7}$ ions;
ion accelerator means receiving the $0^{+7}$ ions from said discharge device for producing a directed ion beam including ions in a metastable state;
separator means for receiving said directed ion beam and for passing only ions in the metastable state;
means for producing polarized optical radiation at approximately 10,600 A; and
means for receiving a flow of $0^{+7}$ ions in the meta-stable state from said separator means and for directing said optical radiation into said ions to produce X-rays at approximately 19 A. Bragg planes of the resonator crystals are parallel to the axis of polarization of said radiation, said resonator means being operative to produce a beam of coherent of X-rays at approximately 19 A.

* * * * *

UNITED STATES PATENT AND TRADEMARK OFFICE
CERTIFICATE OF CORRECTION

PATENT NO. : 4,034,226
DATED : July 5, 1977
INVENTOR(S) : Isaac Freund

It is certified that error appears in the above-identified patent and that said Letters Patent are hereby corrected as shown below:

IN THE ABSTRACT

```
           Line  4,  ";" should be ---:---.
           Line 10,  "transistion" should be ---transition---.
           Line 20,  "turning" should be ---tuning---.
Col. 2,    Line 48,  "radiation" should be ---radiative---.
Col. 2,    Line 58,  "above" should be ---about---.
Col. 3,    Line  3,  "ap" should be ---2p---.
Col. 3,    Line 16,  "mush" should be ---much---.
Col. 3,    Line 36,  "rediation" should be ---radiation---.
Col. 3,    Line 49,  "polse" should be ---pulse---.
Col. 3,    Line 62,  after "X-Y" insert ---plane---.
Col. 4,    Line 50,  "consideration" should be ---considerations---.
Col. 5,    Lines 19 - 20, "constrant" should be ---constraint---.
Col. 5,    Line 47,  "turned" should be ---tuned---.
Col. 6,    Lines 60 - 64, delete "Bragg planes . . . 19A".
```

Signed and Sealed this

Seventh Day of March 1978

[SEAL]

Attest:

RUTH C. MASON
Attesting Officer

LUTRELLE F. PARKER
Acting Commissioner of Patents and Trademarks